(12) United States Patent
Kuroita et al.

(10) Patent No.: US 9,666,312 B2
(45) Date of Patent: May 30, 2017

(54) NATURAL-CIRCULATION BOILING WATER REACTOR AND CHIMNEY THEREFOR

(71) Applicant: Hitachi-GE Nuclear Energy, Ltd., Hitachi-shi, Ibaraki (JP)

(72) Inventors: Sho Kuroita, Hitachi (JP); Sadakatsu Sawahata, Hitachi (JP); Yasuhiro Mabuchi, Hitachi (JP); Hiroaki Asakura, Hitachi (JP); Fumihito Hirokawa, Hitachi (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 41 days.

(21) Appl. No.: 14/442,934

(22) PCT Filed: Nov. 16, 2012

(86) PCT No.: PCT/JP2012/079758
§ 371 (c)(1),
(2) Date: May 14, 2015

(87) PCT Pub. No.: WO2014/076811
PCT Pub. Date: May 22, 2014

(65) Prior Publication Data
US 2015/0332793 A1    Nov. 19, 2015

(51) Int. Cl.
*G21C 15/26* (2006.01)
*G21C 1/08* (2006.01)

(52) U.S. Cl.
CPC ............. *G21C 15/26* (2013.01); *G21C 1/084* (2013.01); *Y02E 30/31* (2013.01)

(58) Field of Classification Search
CPC ................................ G21C 15/26; G21C 1/084
(Continued)

(56) References Cited

U.S. PATENT DOCUMENTS 3,077,443 A * 2/1963 Camack ................. G21C 15/26
376/371
5,180,547 A    1/1993 Van Kuijk
(Continued)

FOREIGN PATENT DOCUMENTS

GB           902833      *   8/1962
JP       59-136676 A       8/1984
(Continued)

OTHER PUBLICATIONS

International Search Report (PCT/ISA/210) dated Dec. 18, 2012 with English-language translation (four (4) pages).
(Continued)

*Primary Examiner* — Jack W Keith
*Assistant Examiner* — Daniel Wasil
(74) *Attorney, Agent, or Firm* — Crowell & Moring LLP

(57) ABSTRACT

A chimney arranged inside of a reactor pressure vessel of a natural-circulation boiling water reactor is provided. The chimney includes plural flow channels which guide a steam-water two-phase flow generated in a reactor core to the upper part of the reactor pressure vessel. Each of the flow channels is formed by plural flow channel separation walls whose lower-most part is supported by a chimney lattice plate. Chimney spacers that support a horizontal load are arranged between the flow channel separation walls of the adjacent flow channels. Chimney support rings that support the horizontal load are arranged at the outermost periphery of the plural flow channels that are supported by the chimney lattice plate.

17 Claims, 8 Drawing Sheets

(58) Field of Classification Search
USPC .................................... 376/370, 373, 377
See application file for complete search history.

(56) References Cited

U.S. PATENT DOCUMENTS

| | | | |
|---|---|---|---|
| 5,268,945 A | 12/1993 | Van Kuijk | |
| 5,857,006 A * | 1/1999 | Oosterkamp | G21C 15/16 376/377 |
| 7,769,124 B2 | 8/2010 | Watanabe et al. | |
| 7,907,695 B2 * | 3/2011 | Watanabe | G21C 15/00 376/399 |
| 2007/0274428 A1 * | 11/2007 | Chaki | G21C 15/26 376/308 |
| 2009/0116608 A1 | 5/2009 | Abe et al. | |

FOREIGN PATENT DOCUMENTS

| | | | | |
|---|---|---|---|---|
| JP | 59-212795 A | 12/1984 | | |
| JP | 7-27051 B2 | 3/1995 | | |
| JP | 2007-47090 A | 2/2007 | | |
| JP | 2007-232433 | * | 9/2007 | ............. G21C 15/02 |
| JP | 2007-232433 A | 9/2007 | | |
| JP | 2007-232546 A | 9/2007 | | |
| JP | 2009-210497 | * | 9/2009 | ............. G21C 15/16 |
| JP | 2009-210497 A | 9/2009 | | |
| JP | 4500276 B2 | 4/2010 | | |
| JP | 2010-175284 A | 8/2010 | | |
| JP | 2011-69751 A | 4/2011 | | |
| JP | 4851811 B2 | 1/2012 | | |
| JP | 2012-137356 A | 7/2012 | | |

OTHER PUBLICATIONS

Extended European Search Report issued in counterpart European Application No. 12888573.8 dated Jun. 10, 2016 (seven (7) pages).

* cited by examiner

NATURAL-CIRCULATION BOILING WATER REACTOR AND CHIMNEY THEREFOR

TECHNICAL FIELD

The present invention relates to a natural-circulation boiling water reactor and a chimney therefor, and relates more specifically to a natural-circulation boiling water reactor suitable to one including a chimney that is of a type of driving coolant within the reactor by natural circulation without using a recirculation pump and promotes natural circulation of the coolant within a reactor pressure vessel, and a chimney therefor.

BACKGROUND ART

Normally, a natural-circulation boiling water reactor includes a chimney disposed inside the reactor pressure vessel and above the reactor core (refer to Patent Document 1, for example). This chimney is for promoting natural circulation of the coolant in the inside of the reactor pressure vessel by guiding the coolant delivered from the reactor core side in a state of a steam-water two-phase flow to the upper side of the reactor pressure vessel.

In the past, with respect to the chimney, there is one in which plate materials formed of a stainless steel and the like are assembled into a lattice shape, and are formed integrally by welding the positions where the plate materials cross each other (refer to Patent Document 2, for example). As another chimney, there is also one in which square tubes formed of a stainless steel and the like are disposed in a staggered shape, and are formed integrally with embracing the top and bottom thereof being embraced by lattice-shape support plates (refer to Patent Document 3, for example).

CITATION LIST

Patent Document

Patent Document 1: Japanese Examined Patent Application No. Hei-7-027051
Patent Document 2: Japanese Patent No. 4500276
Patent Document 3: Japanese Patent No. 4851811

SUMMARY OF THE INVENTION

Technical Problem to be Solved by the Invention

Although the flow channel separation walls are formed by the plate materials or the square tubes in the chimney in the natural-circulation boiling water reactor of a conventional art, a horizontal load generated by a flow induced vibration caused by that the steam-water two phase flow of the coolant flows in from the reactor core side or by an earthquake is applied to the flow channel separation walls, and therefore structural soundness capable of standing the load is required for the flow channel separation walls.

Also, in order to improve this structural soundness of the flow channel separation walls of the chimney, it is common to increase the thickness of the members forming the flow channel separation walls or to reduce the area of the flow channel formed by the flow channel separation walls, and it is supposed that the structural soundness of the flow channel separation walls of the chimney can be thereby improved.

However, when the thickness of the members forming the flow channel separation walls of the chimney is increased, not only the manufacturing cost of the chimney increases but also the total weight of the chimney increases, and, in handling the chimney, problems come to occur in installation into the reactor and in working. Further, also in the case of reducing the area of the flow channels formed by the flow channel separation walls of the chimney, the total number of pieces of the flow channel separation walls of the chimney increases, and problems similar to the case described above come to occur.

The present invention has been developed in view of the points described above, and its object is to provide a natural-circulation boiling water reactor and a chimney therefor which can secure the structural soundness capable of standing the horizontal load generated by a flow induced vibration, earthquake, and the like.

Solution to Problem

In order to achieve the object described above, the chimney for a natural-circulation boiling water reactor of the present invention is characterized to include a plurality of flow channels that are arranged in the inside of a reactor pressure vessel and guide a steam-water two phase flow generated in a reactor core to the upper side of the reactor pressure vessel, in which each of the flow channels is formed so as to be partitioned by a plurality of flow channel separation walls whose lowest part is supported by a chimney lattice plate, chimney spacers that support a horizontal load each other are arranged between flow channel separation walls of the adjacent flow channels, and ring-like members that support a horizontal load are arranged in the outermost periphery of the plurality of flow channels that are supported by the chimney lattice plate.

Also, the chimney for a natural-circulation boiling water reactor of the present invention is characterized in that the plurality of flow channels are formed of square tubes partitioned by the plurality of flow channel separation walls and having a rectangular cross section, each of the plurality of flow channels is arranged alternately in the front/rear and right/left direction, and the chimney spacers having a cross-shape cross section are arranged at corners between flow channel separation walls of the adjacent square tubes.

Also, the chimney for a natural-circulation boiling water reactor of the present invention is characterized in that the plural flow channels are formed of square tubes partitioned by the plurality of flow channel separation walls and having a rectangular cross section, each of the plural flow channels is arranged alternately in the front/rear and right/left direction, and the chimney spacers having a rectangular cross section are arranged at corners between flow channel separation walls of the adjacent angular tubes.

Also, the chimney for a natural-circulation boiling water reactor of the present invention is characterized in that a plurality of the chimney spacers are arranged at a predetermined interval in the axial direction.

Also, the chimney for a natural-circulation boiling water reactor of the present invention is characterized in that the chimney spacers are arranged on a same plane of the ring-like member.

Also, the chimney for a natural-circulation boiling water reactor of the present invention is characterized in that a plurality of the ring-like members are arranged at a predetermined interval above the chimney lattice plate.

Also, the chimney for a natural-circulation boiling water reactor of the present invention is characterized in that the upper-most part of the plurality of flow channel separation walls whose lower-most part is supported by the chimney lattice plate is supported by another chimney lattice plate, and plural numbers of the ring-like members are arranged at a predetermined interval between the lower-most and upper-most chimney lattice plates.

Also, the chimney for a natural-circulation boiling water reactor of the present invention is characterized in that the upper-most part of the plural flow channel separation walls whose lower-most part is supported by the chimney lattice plate is supported by another chimney lattice plate, and the ring-like members are arranged in the middle between the lower-most and upper-most chimney lattice plates.

Also, the chimney for a natural-circulation boiling water reactor of the present invention is characterized in that portions arranged at the outermost periphery and supported by the ring-like members out of the plural flow channel separation walls are cut, and cut end parts of the flow channel separation walls are supported by the ring-like members through chimney support plates.

Also, the chimney for a natural-circulation boiling water reactor of the present invention is characterized in that the plural flow channel separation walls are formed of chimney plates, the plural flow channels are formed to have a rectangular cross section partitioned by the chimney plates, and the chimney spacers having a cross-shape cross section are arranged at corners between the adjacent chimney plates.

Also, the chimney for a natural-circulation boiling water reactor of the present invention is characterized in that portions positioned at the outermost periphery and supported by the ring-like members out of the chimney plates that form the plural flow channels are cut, and cut end parts of the chimney plates are supported by the ring-like members through chimney support plates.

Also, the chimney for a natural-circulation boiling water reactor of the present invention is characterized in that the chimney spacers are arranged only on a same plane of the ring-like member.

Also, the chimney for a natural-circulation boiling water reactor of the present invention is characterized in that the ring-like member includes plural holes arranged so as to penetrate in the vertical direction thereof, and is fixed by that chimney rods are inserted into the holes and the lower ends of the chimney rods are fastened to the chimney lattice plates arranged below.

Further, in order to achieve the object described above, the natural-circulation boiling water reactor of the present invention is characterized to include a reactor pressure vessel, a reactor core arranged inside the reactor pressure vessel and loaded with plural fuel assemblies, a core shroud that surrounds the periphery of the reactor core, a lattice plate that forms the upper part of the reactor core, a chimney erected on the lattice plate, a steam-water separator arranged in the upper part of the chimney, and a steam dryer arranged in the upper part of the steam-water separator, in which the chimney is the chimney for a natural-circulation boiling water reactor of the configuration described above.

Advantageous Effects of the Invention

According to the present invention, there is an effect of securing structural soundness capable of standing a horizontal load generated by a flow induced vibration, earthquake and the like.

DESCRIPTION OF THE EMBODIMENTS

Figure 1:
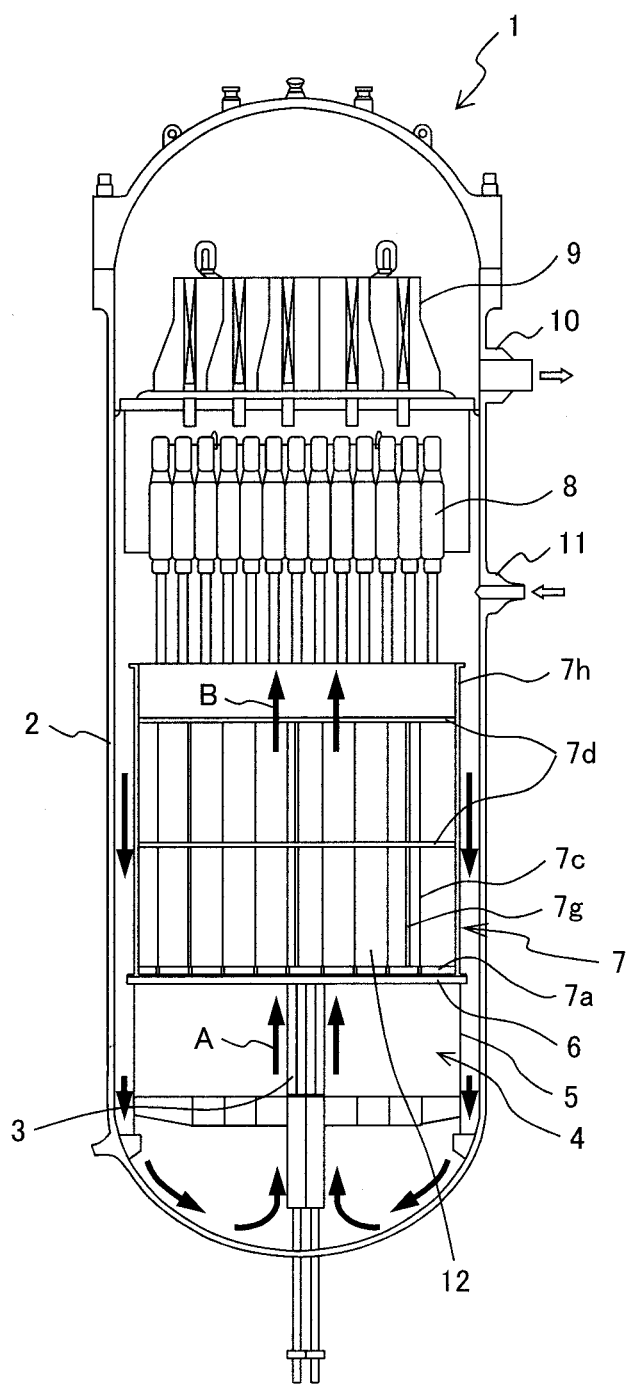
FIG. 1 is a cross-sectional view showing the total configuration in Embodiment 1 of the natural-circulation boiling water reactor of the present invention.

Below, the natural-circulation boiling water reactor and the chimney therefor of the present invention will be described based on the embodiments shown in the drawings. Also, a same reference sign will be used for a same configuration component in each embodiment.

Embodiment 1

The total configuration in Embodiment 1 of the natural-circulation boiling water reactor of the present invention is shown in FIG. 1. As shown in the figure, the natural-circulation boiling water reactor 1 of the present embodiment incorporates followings in a reactor pressure vessel 2 as structures within the reactor: a reactor core 4 in which plural fuel assemblies 3 are loaded; a core shroud 5 of a tubular shape which surrounds the outer periphery of the reactor core 4; an upper lattice plate 6 that forms the upper part of the reactor core 4; a chimney 7 of a tubular shape erected on the upper lattice plate 6; a steam-water separator 8 furnished on the chimney 7 and attached with stand pipes that cover the upper end of the chimney 7; and a steam dryer 9 furnished above the steam-water separator 8 so that the skirt section in the lower part surrounds the steam-water separator 8. Also, in the reactor pressure vessel 2, a steam outlet nozzle 10 and a supply water inlet nozzle 11 are furnished.

Further, the coolant (arrow A in FIG. 1) delivered from the reactor core 4 stored inside the reactor pressure vessel 2 in a state of a steam-water two-phase flow is guided to the upper side of the reactor pressure vessel 2 through the chimney 7 (arrow B in FIG. 1), and a drive force required for natural circulation is obtained by the specific gravity difference between the coolant with a low density guided to the upper side of the reactor pressure vessel 2 and the coolant of the liquid phase mixed with the feed water supplied from the feed water inlet nozzle 11. The chimney 7 is provided for promoting the natural circulation of the coolant inside the reactor pressure vessel 2 described above.

Although it will be described in detail below, as shown in FIG. 1, the chimney 7 is mainly formed of a chimney barrel 7h, a chimney lattice plate 7a, square tubes 12 that form chimney flow channel separation walls 7c, chimney support rings 7d, chimney spacers 7e, chimney support plates 7f, and chimney rods 7g.

As shown in FIG. 1, the chimney barrel 7h described above is arranged inside the reactor pressure vessel 2 and above the reactor core 4, is formed of a member of a tubular shape, and is arranged so as to be concentric with the reactor pressure vessel 2 of a tubular shape.

Figure 2:
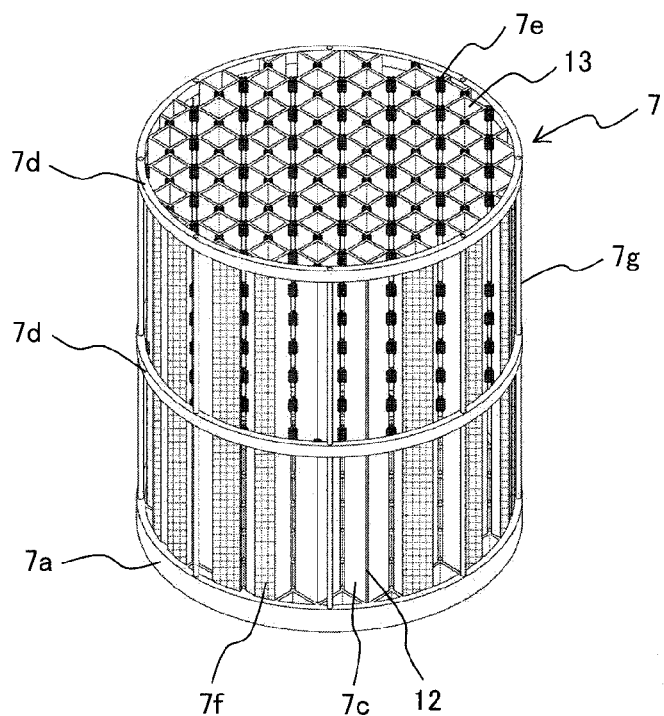
FIG. 2 is a perspective view showing Embodiment 1 of the chimney for a natural-circulation boiling water reactor of the present invention.
Figure 3:
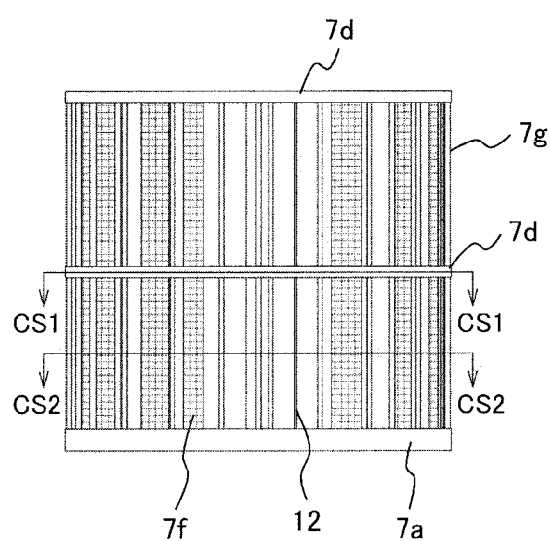
FIG. 3 is a front view of FIG. 2.

Next, the detailed structure of Embodiment 1 of the chimney 7 will be described using FIG. 2 to FIG. 6. FIG. 2 shows the structure excluding the chimney barrel 7h.

As shown in the figure, the chimney 7 of the present embodiment is arranged inside the reactor pressure vessel 2 shown in FIG. 1 and includes plural flow channels 13 that guide a steam-water two phase flow generated in the reactor core 4 to the upper side of the reactor pressure vessel 2, each of the flow channels 13 is formed so as to be partitioned by the plural chimney flow channel separation walls 7c whose lower-most part is supported by the chimney lattice plate 7a, the chimney spacers 7e having a cross section of a cross shape which support a horizontal load with each other are arranged between the chimney flow channel separation walls 7c of the adjacent flow channels 13, and the chimney support rings 7d that are ring-like members supporting a horizontal load are arranged in the outermost periphery of the plural flow channels 13 that are supported by the chimney lattice plate 7a.

More specifically, the chimney lattice plate 7a is arranged in the lower part of the chimney flow channel separation walls 7c inside the chimney barrel 7h in order to support the plural chimney flow channel separation walls 7c, and is disposed so as to be concentric with the chimney barrel 7h. This chimney lattice plate 7a is arranged on a flange on the inner side of the chimney barrel 7h. Also, as shown in FIG. 5, the chimney lattice plate 7a includes a number of chimney lattice plate holes 7b that allow the steam-water two phase flow delivered from the reactor core 4 to pass therethrough.

Also, the plural flow channels 13 are formed of the square tubes 12 having a rectangular (quadrangular) cross section partitioned by the plural chimney flow channel separation walls 7c, each of the square tubes 12 is arranged alternately in the front/rear and right/left direction (plane direction) and is arranged in a staggered shape continuing in the obliquely right and left direction, and plural numbers of each of the square tubes 12 are arranged extending vertically to the upward direction from the chimney lattice plate 7a with regularity as shown in FIG. 2. The square tubes 12 are inserted into the chimney lattice plate holes 7b alternately, and the ends thereof are welded and fixed to the chimney lattice plate holes 7b. Also, the square tubes 12 may be placed on the chimney lattice plate 7a so as to surround the chimney lattice plate holes 7b to be welded and fixed instead of being inserted into the chimney lattice plate holes 7b.

Figure 5:
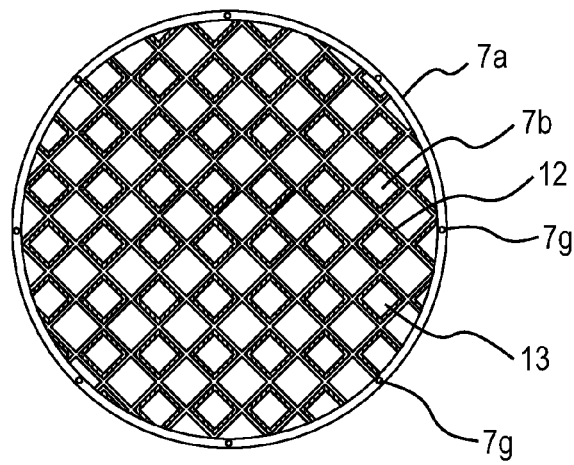
FIG. 5 is a cross-sectional view taken along the line cs2-cs2 of FIG. 3.

Further, as shown in FIG. 5, the side surface of the square tube 12 arranged in the outermost peripheral part of the chimney lattice plate 7a is cut in the vertical direction thereof so as to match the shape of the chimney lattice plate hole 7b where the square tube 12 is arranged.

Figure 4:
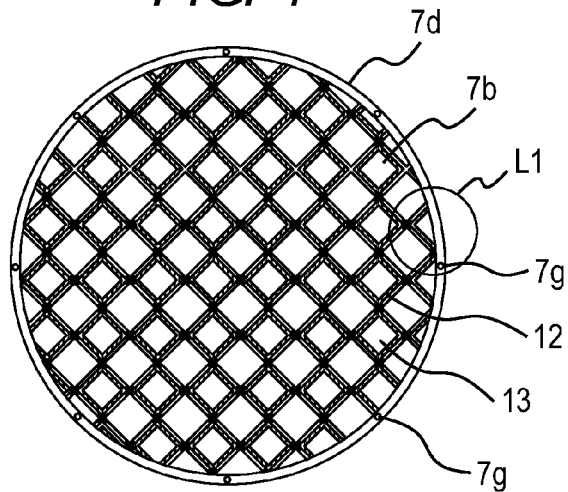
FIG. 4 is a cross-sectional view taken along the line cs1-cs1 of FIG. 3.
Figure 6:
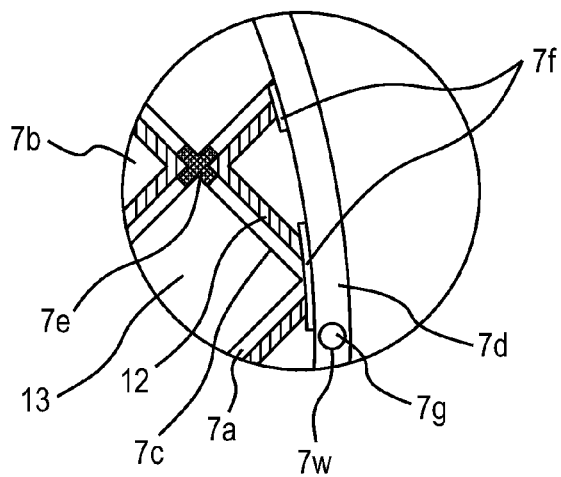
FIG. 6 is an enlarged view of the region L1 of FIG. 4.

Also, in the present embodiment, as shown in FIG. 4 and FIG. 6, the chimney spacers 7e having a cross-shape cross section which support a horizontal load each other are arranged in the gaps of the corners of the adjacent square tubes 12 (the corners between the chimney flow channel separation walls 7c), and are fixed by welding at several positions over the vertical direction of the square tubes 12. By these chimney spacers 7e, the adjacent square tubes 12 come to restrict the horizontal movement each other.

Further, in the present embodiment, the plural chimney support rings 7d that support the horizontal load are arranged at a predetermined interval in the vertical direction of the square tubes 12 (two positions of the upper-most part and the middle part of the square tubes 12 in the present embodiment), and these chimney support rings 7d are arranged on planes same ("same" referred to here includes slight shift caused by a manufacturing error and the like) to all positions where the chimney spacers 7e described above are arranged.

Also, as shown in FIG. 6, the side surface of the portion positioned at the outermost periphery and supported by the chimney support ring 7d out of the plural chimney flow channel separation walls 7c is cut, and the cut end of the chimney flow channel separation wall 7c is connected to the chimney support ring 7d through the chimney support plate 7f that is arranged without a space between the chimney support ring 7d. Therefore, the chimney support ring 7d come to restrict the horizontal movement of all square tubes 12 that form the chimney 7 by interposing the chimney support plates 7f and the chimney spacers 7e.

Further, all of the chimney support rings 7d include holes for the plural chimney rods 7g that are arranged so as to penetrate the chimney support rings 7d in the vertical direction, the chimney rods 7g are inserted into these holes at plural positions, and the chimney rods 7g are fixed to the chimney support rings 7d by a welded connection 7w at the penetration portions. In contrast, the lower end of the chimney rod 7g is inserted to the hole arranged in the vertical direction of the chimney lattice plate 7a and is fixed by welded connection 7w.

Thereby, the chimney support rings 7d come to receive a restriction force in the horizontal direction by the chimney lattice plate 7a.

Thus, in the present embodiment, the horizontal load comes to be supported by the chimney lattice plate 7a arranged below the chimney flow channel separation walls 7c, the chimney support rings 7d arranged in plural numbers above the chimney lattice plate 7a, the chimney spacers 7e, and the chimney support plates 7f instead of supporting the horizontal load of the chimney flow channel separation walls 7c only by the lattice-like support plates arranged in the upper part and the lower part of the chimney flow channel separation walls 7c as done in the past, and therefore there is an effect of securing structural soundness capable of standing a horizontal load generated by a flow induced vibration caused by that a steam-water two phase flow of the coolant flows in from the reactor core side or an earthquake.

Also, in the present embodiment, because it is configured that the horizontal load of the chimney flow channel separation walls 7c can be supported at plural positions in the vertical direction thereof, the structural soundness can be improved compared to the chimney structure of the conventional art.

Further, because the welded section for arranging the square tubes 12 in the chimney lattice plate 7a is reduced by half, the amount of the thermal deformation by the weld heat the square tubes 12 receive is reduced.

Furthermore, because only one of the chimney lattice plate 7a that is a heavy item is arranged, the total weight of the chimney 7 can be reduced, and the handling performance in installation into the reactor pressure vessel 2 or in dismantling comes to be improved.

In addition, because the chimney rods 7g are made to pass from the chimney support ring 7d in the upper-most side to the chimney lattice plate 7a in the lower-most side and are welded, in hanging in or hanging out the chimney 7 to or from the reactor pressure vessel 2, even when hanging jigs are attached to the chimney support ring 7d in the upper-most side, by attaching hanging fixtures in the upper part of the chimney rods 7g, the total weight of the chimney 7 can be supported by the chimney lattice plate 7a that has the highest structural strength, and therefore safety can be ensured.

Further, in the present embodiment, as the flow channel 13, the case of the square tubes 12 of the rectangular (quadrangular) cross section partitioned by the plural chimney flow channel separation walls 7c has been described, however, the present invention is not limited to it, and it is needless to mention that there is a similar effect as far as a tubular shape is formed even if the cross section is in a polygonal shape, a circular shape, and the like, for example. Also, in the present embodiment, as the chimney spacer, the cases of the cross-shape cross section or the rectangular cross section has been described, however, it is needless to mention that the present invention is not limited to these shapes.

Embodiment 2

Figure 7:
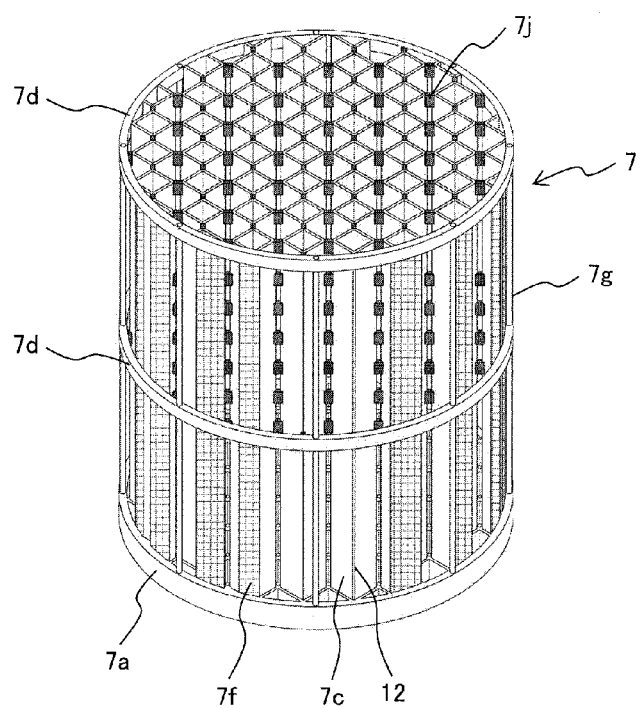
FIG. 7 is a perspective view showing Embodiment 2 of the chimney for a natural-circulation boiling water reactor of the present invention.
Figure 8:
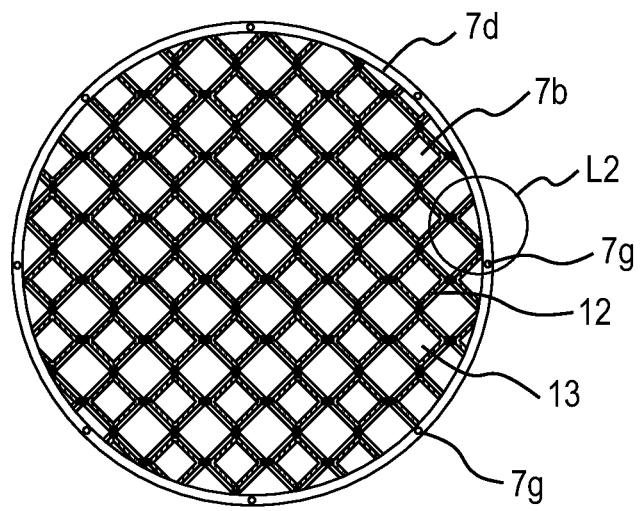
FIG. 8 is a plan view of FIG. 7.
Figure 9:
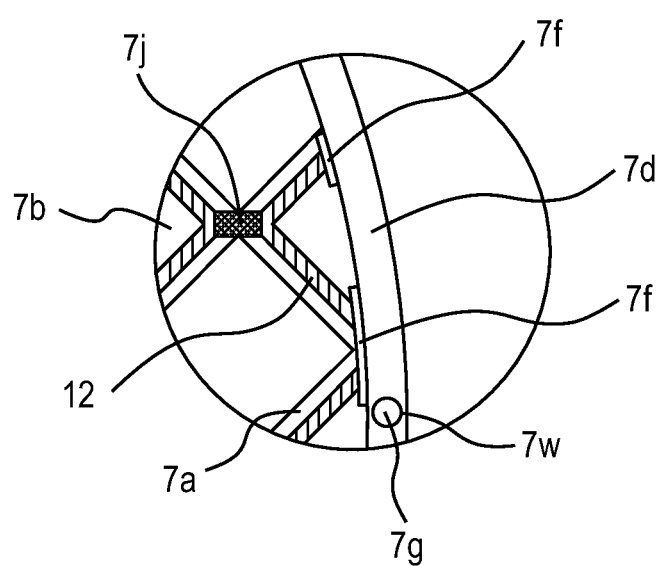
FIG. 9 is an enlarged view of the region L2 of FIG. 8.

In FIG. 7 to FIG. 9, Embodiment 2 of the chimney for a natural-circulation boiling water reactor of the present invention is shown. The present embodiment shown in the figures has a configuration generally same to the configuration of Embodiment 1, and the shape of the chimney spacer and a method for attaching the chimney spacer to the square tube are different compared to Embodiment 1. Other configurations are similar to those of Embodiment 1.

More specifically, in the present embodiment, as shown in FIG. 8 and FIG. 9, chimney spacers 7j having a rectangular cross section which support the horizontal load each other are arranged at the corners of the adjacent square tubes 12 (the corner between the chimney flow channel separation walls 7c), and are fixed by welding at several positions over the vertical direction of the square tubes 12.

In other words, as shown in FIG. 9, in the square tube 12 that forms the chimney flow channel separation walls 7c, the corner where the chimney spacer 7j is arranged is cut-in by machining work, and the chimney spacer 7j is fit-in there and is fixed in this state by welding. By this chimney spacer 7j, the adjacent square tubes 12 come to restrict the horizontal movement each other.

With such configuration of the present embodiment, in addition to that an effect similar to that of Embodiment 1 is obtained, in comparison to Embodiment 1, the chimney spacer 7j can be attached without spoiling the structural soundness with respect to a horizontal load applied to the square tubes 12 that form the chimney flow channel separation walls 7c even when the gap between the adjacent square tubes 12 becomes narrow. Also, because the shape of the chimney spacer 7j can be made simple, the manufacturing cost can be reduced.

Embodiment 3

Figure 10:
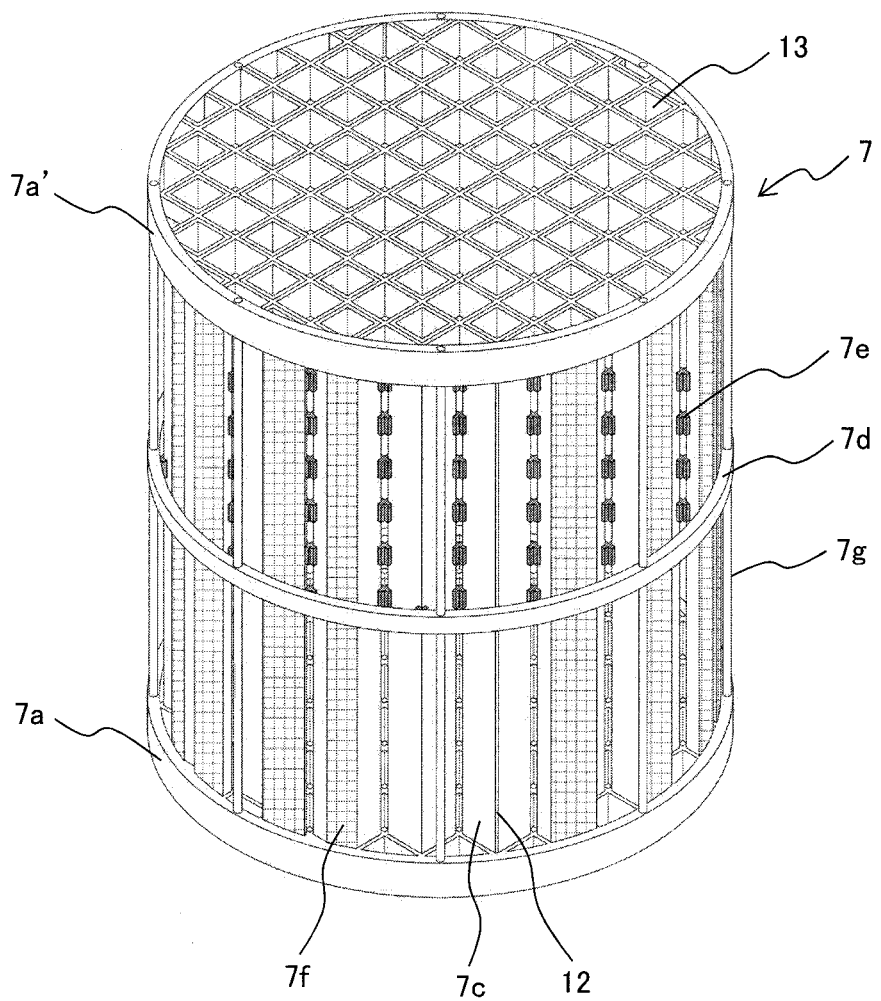
FIG. 10 is a perspective view showing Embodiment 3 of the chimney for a natural-circulation boiling water reactor of the present invention.

In FIG. 10, Embodiment 3 of the chimney for a natural-circulation boiling water reactor of the present invention is shown.

The present embodiment shown in the figure is different in the point of the configuration that the chimney lattice plate 7a is arranged at the upper-most part of the chimney flow channel separation walls 7c instead of the chimney support ring 7d that has been arranged at the upper-most part of the chimney flow channel separation walls 7c in Embodiment 1, and the upper-most parts of the square tubes 12 are restricted by the chimney lattice plate 7a. Other configurations are similar to those of Embodiment 1.

More specifically, in the present embodiment, as shown in FIG. 10, the upper-most part of the plural chimney flow channel separation walls 7c whose lower-most part is supported by the chimney lattice plate 7a is supported by another chimney lattice plate 7a', and the chimney support ring 7d is arranged in the middle between the chimney lattice plate 7a in the lower-most part and the chimney lattice plate 7a' in the upper-most part. Also, the chimney spacers 7e are arranged on a same plane (the definition of "same" referred to here is similar to that of Embodiment 1) of the chimney support ring 7d arranged in the middle between the chimney lattice plate 7a in the lower-most part of the chimney flow channel separation walls 7c and the chimney lattice plate 7a' in the upper-most part.

With such configuration of the present embodiment, in addition to that an effect similar to that of Embodiment 1 is obtained, in comparison to Embodiment 1, the structural soundness of the chimney 7 can be further improved only by adding one piece of the chimney lattice plate 7a that has high structural strength.

Also, in the present embodiment, although a case has been described in which the chimney support ring 7d has been arranged in the middle between the chimney lattice plate 7a in the lower-most part and the chimney lattice plate 7a' in the upper-most part, the present invention is not limited to that, and it is a matter of course that the plural chimney support rings 7d can be arranged between the chimney lattice plate 7a in the lower-most part and the chimney lattice plate 7a' in the upper-most part.

Embodiment 4

Figure 11:
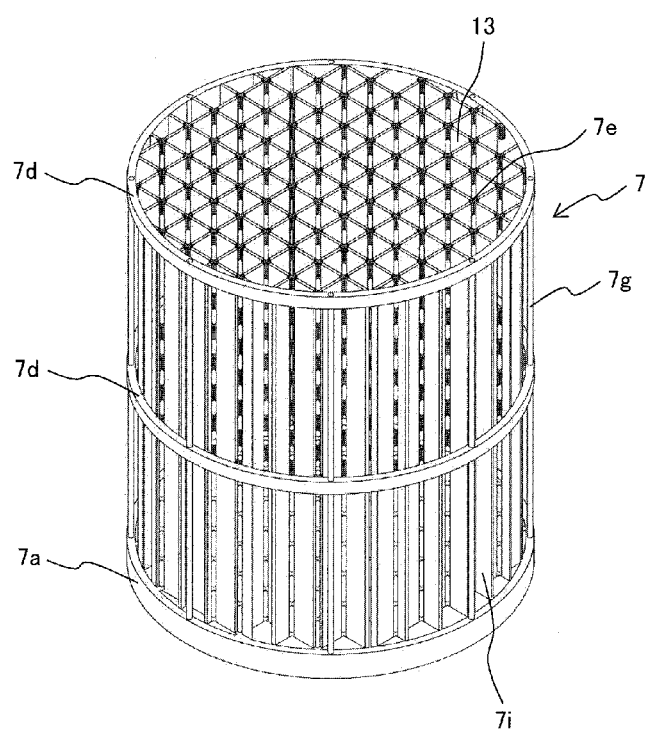
FIG. 11 is a perspective view showing Embodiment 4 of the chimney for a natural-circulation boiling water reactor of the present invention.
Figure 12:
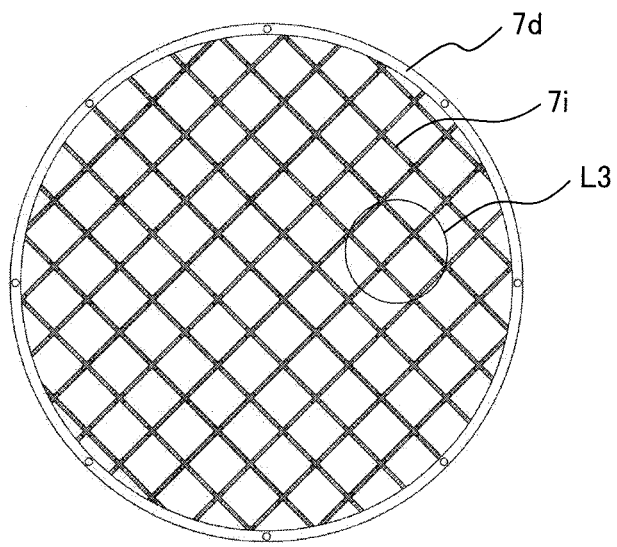
FIG. 12 is a plan view of FIG. 11.
Figure 13:
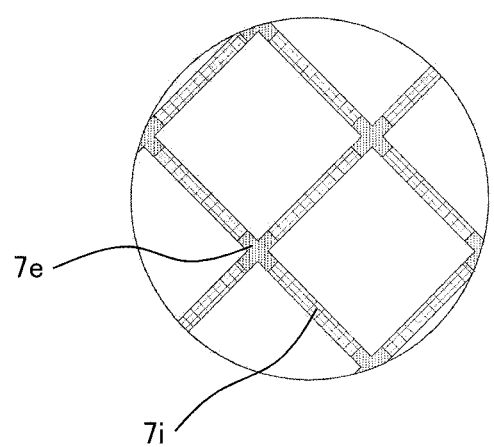
FIG. 13 is an enlarged view of the region L3 of FIG. 12.

In FIG. 11 to FIG. 13, Embodiment 4 of the chimney for a natural-circulation boiling water reactor of the present invention is shown.

The present embodiment shown in the figures is different in a configuration of the chimney flow channel separation walls 7c compared to Embodiment 1. Other configurations are similar to those of Embodiment 1.

More specifically, in the present embodiment, the plural chimney flow channel separation walls 7c are formed of chimney plates 7i of a plate material, the plural flow channels 13 are formed to have a rectangular cross section partitioned by the chimney plates 7i of a plate material, and the chimney placers 7e having a cross-shape cross section are arranged at the corners between the adjacent chimney plates 7i.

Also, in the present embodiment, the plural chimney support rings 7d that are the ring-like members supporting a horizontal load are arranged by plural numbers (two positions of the upper-most part and the middle part of the chimney flow channel separation walls 7c in the present embodiment) at a predetermined interval in the vertical direction of the chimney flow channel separation walls 7c, and these chimney support rings 7d are arranged only on the planes same (the definition of "same" referred to here is similar to that of Embodiment 1) to all positions where the chimney spacers 7e described above are arranged. Further, out of the chimney plates 7i that form the plural flow channels 13, the portions positioned at the outermost periphery and supported by the chimney support ring 7d are cut, and the cut ends of the chimney plates 7i are supported by the chimney support ring 7d through the chimney support plates (not illustrated).

With respect to the chimney flow channel separation walls 7c described above, the lower ends of the chimney plates 7i are fixed by welding to the upper surface of the chimney lattice plate 7a so as to surround the chimney lattice plate holes 7b.

As described above, in the present embodiment, the chimney plates 7i are restricted in the horizontal direction by the chimney support rings 7d that are arranged at the upper end and the middle stage in the vertical direction thereof and the chimney spacers 7e. More specifically, as shown in FIG. 13, it is configured that these chimney plates 7i restrict each other by connecting the chimney spacers 7e by welding between the adjacent chimney plates 7i.

Also, the chimney plates 7i at the outermost periphery of the chimney lattice plate 7a are connected to the chimney support rings 7d by interposing the chimney support plates (illustration thereof is omitted) at the ends in the horizontal direction, and therefore all of the chimney plates 7i come to be restricted in the horizontal direction by the chimney support rings 7d.

Therefore, with such configuration of the present embodiment, in addition to that an effect similar to that of Embodiment 1 is obtained, the chimney plate 7i is welded to the adjacent chimney plates 7i only at the attaching portions of the chimney spacers 7e instead of being welded at all periphery in the vertical direction thereof, and therefore even when the chimney flow channel separation walls 7c are to be configured using the chimney plates 7i, the amount of the thermal deformation by the weld heat can be suppressed.

Also, in the ends of the chimney plates 7i, because the requirement of the degree of the surface finishing becomes loose with the exception of the positions welded to the chimney lattice plate 7a and the chimney spacers 7e, the manufacturing cost can be also reduced.

Further, the present invention is not limited to the embodiments described above, and various modifications are included therein. For example, the embodiments described above have been explained in detail in order to facilitate easy understanding of the present invention, and the present invention is not necessarily limited to those including all configurations described. Also, a part of the configuration of an embodiment can be replaced by the configuration of another embodiment, and the configuration of another embodiment can be added to the configuration of an embodiment. Further, with respect to a part of the configuration of each embodiment, it is possible to effect addition, deletion and replacement of another configuration.

REFERENCE SIGNS LIST

1 . . . natural-circulation boiling water reactor
2 . . . reactor pressure vessel
3 . . . fuel assembly
4 . . . reactor core
5 . . . core shroud
6 . . . upper lattice plate
7 . . . chimney
7a, 7a' . . . chimney lattice plate
7b . . . chimney lattice plate hole
7c . . . chimney flow channel separation wall
7d . . . chimney support ring
7e, 7j . . . chimney spacer
7f . . . chimney support plate
7g . . . chimney rod
7h . . . chimney barrel
7i . . . chimney plate
8 . . . steam-water separator
9 . . . steam dryer
10 . . . steam outlet nozzle
11 . . . feed water inlet nozzle
12 . . . square tube
13 . . . flow channel

The invention claimed is:

1. A chimney arranged inside of a reactor pressure vessel of a natural-circulation boiling water reactor, comprising:
a chimney lattice plate;
a plurality of flow channels that guide a steam-water two phase flow generated in a reactor core to the upper side of the reactor pressure vessel, wherein each of the flow channels includes a plurality of flow channel separation walls whose lower-most part is supported by the chimney lattice plate;
chimney spacers that support a horizontal load and are arranged between flow channel separation walls of the adjacent flow channels; and
a plurality of chimney support rings that support a horizontal load and are arranged at a predetermined interval in the outermost periphery of the plurality of flow channels that are supported by the chimney lattice plate, the plurality of chimney support rings being arranged above the chimney lattice plate.

2. The chimney arranged inside of the reactor pressure vessel of the natural-circulation boiling water reactor according to claim 1, wherein
the plurality of flow channels are formed by the plurality of flow channel separation walls and have a rectangular cross section, and
chimney spacers having a cross-shape cross section are arranged at corners between flow channel separation walls of adjacent flow channels.

3. The chimney arranged inside of the reactor pressure vessel of the natural-circulation boiling water reactor according to claim 1, wherein
the plurality of flow channels are formed of square tubes partitioned by the plurality of flow channel separation walls and having a rectangular cross section,
each of the plurality of flow channels is arranged alternately in the front/rear and right/left direction, and
chimney spacers having a cross-shape cross section are arranged at corners between flow channel separation walls of the adjacent square tubes.

4. The chimney arranged inside of the reactor pressure vessel of the natural-circulation boiling water reactor according to claim 2, wherein
a plurality of the chimney spacers are arranged at a predetermined interval in the axial direction.

5. The chimney arranged inside of the reactor pressure vessel of the natural-circulation boiling water reactor according to claim 4, wherein
the chimney spacers are arranged on a same plane of the chimney support rings.

6. The chimney arranged inside of the reactor pressure vessel of the natural-circulation boiling water reactor according to claim 5, wherein
a plurality of the chimney support rings are arranged at a predetermined interval above the chimney lattice plate.

7. The chimney arranged inside of the reactor pressure vessel of the natural-circulation boiling water reactor according to claim 5, wherein
an upper-most part of the plurality of flow channel separation walls whose lower-most part is supported by the chimney lattice plate is supported by another chimney lattice plate, and at least one of the chimney support rings is arranged between the chimney lattice plate and the another chimney lattice plate.

8. The chimney arranged inside of the reactor pressure vessel of the natural-circulation boiling water reactor according to claim 7, wherein
the chimney support rings are arranged in the middle between the lower-most and upper-most chimney lattice plates.

9. The chimney arranged inside of the reactor pressure vessel of the natural-circulation boiling water reactor according to claim 8, wherein
portions arranged at the outermost periphery and supported by the chimney support rings out of the plurality of flow channel separation walls are cut, and
cut end parts of the flow channel separation walls are supported by the chimney support rings through chimney support plates.

10. The chimney arranged inside of the reactor pressure vessel of the natural-circulation boiling water reactor according to claim 1, wherein
the plurality of flow channel separation walls are formed of chimney plates,
the plurality of flow channels are formed to have a rectangular cross section partitioned by the chimney plates, and
chimney spacers having a cross-shape cross section are arranged at corners between the adjacent chimney plates.

11. The chimney arranged inside of the reactor pressure vessel of the natural-circulation boiling water reactor according to claim 10, wherein
portions positioned at the outermost periphery and supported by the chimney support rings out of the chimney plates that form the plurality of flow channels are cut, and
cut end parts of the chimney plates are supported by the chimney support rings through chimney support plates.

12. The chimney arranged inside of the reactor pressure vessel of the natural-circulation boiling water reactor according to claim 11, wherein
a plurality of the chimney support rings are arranged at a predetermined interval above the chimney lattice plate.

13. The chimney arranged inside of the reactor pressure vessel of the natural-circulation boiling water reactor according to claim 11, wherein
the chimney spacers are arranged only on a same plane of the chimney support rings.

14. The chimney arranged inside of the reactor pressure vessel of the natural-circulation boiling water reactor according to claim 12, further comprising chimney rods;
wherein each of the chimney support rings includes a plurality of holes arranged so as to penetrate in the vertical direction of the chimney support ring, and is fixed by the chimney rods which are inserted into the holes, wherein lower ends of the chimney rods are fastened to the chimney lattice plate arranged below.

15. A natural-circulation boiling water reactor, comprising:
a reactor pressure vessel;
a reactor core arranged inside the reactor pressure vessel and loaded with a plurality of fuel assemblies;
a core shroud that surrounds the periphery of the reactor core;
a lattice plate that forms the upper part of the reactor core;
a chimney erected on the lattice plate;
a steam-water separator arranged above the chimney; and
a steam dryer arranged above the steam-water separator, wherein
the chimney is arranged inside of the reactor pressure vessel of the natural-circulation boiling water reactor according to claim 14.

16. The chimney arranged inside of the reactor pressure vessel of the natural-circulation boiling water reactor according to claim 5, further comprising chimney rods;
wherein each of the chimney support rings includes a plurality of holes arranged so as to penetrate in the vertical direction of the chimney support ring, and is fixed by the chimney rods which are inserted into the holes, wherein lower ends of the chimney rods are fastened to the chimney lattice plate arranged below.

17. The chimney arranged inside of the reactor pressure vessel of the natural-circulation boiling water reactor according to claim 1, further comprising chimney rods;
wherein each of the chimney support rings includes a plurality of holes arranged so as to penetrate in the vertical direction of the chimney support ring, and is fixed by the chimney rods which are inserted into the holes, wherein lower ends of the chimney rods are fastened to the chimney lattice plate arranged below.

* * * * *